United States Patent [19]

Kausch et al.

[11] Patent Number: 5,674,565
[45] Date of Patent: Oct. 7, 1997

[54] LIQUID THERMOSET SEALERS AND SEALING PROCESS FOR MOLDED PLASTICS

[75] Inventors: Charles M. Kausch; Russell A. Livigni, both of Akron; Earl G. Melby, Uniontown; Satish C. Sharma, Stow, all of Ohio

[73] Assignee: Cambridge Industries, Inc., Madison Heights, Mich.

[21] Appl. No.: 361,913

[22] Filed: Dec. 22, 1994

Related U.S. Application Data

[63] Continuation of Ser. No. 81,767, Jun. 23, 1993, abandoned.

[51] Int. Cl.$^6$ .................................. B05D 1/38; B05D 3/02
[52] U.S. Cl. .................. 427/258; 427/284; 427/314; 427/316; 427/385.5
[58] Field of Search .................. 427/273, 284, 427/314, 316, 322, 385.5, 386, 140, 258; 428/272, 273, 482

[56] References Cited

U.S. PATENT DOCUMENTS

| | | |
|---|---|---|
| 2,690,592 | 4/1954 | Schanz . |
| 3,002,849 | 10/1961 | Harmon et al. . |
| 3,026,566 | 3/1962 | Martelli et al. . |
| 3,147,144 | 9/1964 | Wilhelm . |
| 3,523,031 | 8/1970 | Walters . |
| 3,538,043 | 11/1970 | Herold . |
| 3,613,159 | 10/1971 | Bieglep . |
| 3,671,300 | 6/1972 | Kawakita et al. . |
| 3,720,540 | 3/1973 | Wimmer . |
| 3,723,153 | 3/1973 | Suita et al. . |
| 3,728,776 | 4/1973 | Defazio .................. 29/401 |
| 3,742,106 | 6/1973 | Price .................. 264/131 |
| 3,814,645 | 6/1974 | Fletcher et al. .................. 156/94 |
| 4,024,304 | 5/1977 | Smock et al. .................. 427/316 |
| 4,081,578 | 3/1978 | van Essen et al. .................. 428/63 |
| 4,093,674 | 6/1978 | Tsutsui et al. .................. 260/830 |
| 4,235,952 | 11/1980 | Holmes et al. .................. 428/60 |
| 4,239,808 | 12/1980 | Arnason .................. 428/482 |
| 4,293,686 | 10/1981 | Gardner .................. 528/192 |
| 4,331,735 | 5/1982 | Shanoski .................. 428/423.7 |
| 4,374,238 | 2/1983 | Shanoski .................. 528/50 |
| 4,409,270 | 10/1983 | Faber et al. .................. 428/63 |
| 4,414,173 | 11/1983 | Cobbledick et al. .................. 264/257 |
| 4,508,785 | 4/1985 | Cobbledick et al. .................. 428/424.4 |
| 4,526,939 | 7/1985 | Lewarchik et al. .................. 525/438 |
| 4,559,164 | 12/1985 | Kostelnik et al. .................. 252/511 |
| 4,567,106 | 1/1986 | Sano et al. .................. 428/413 |
| 4,603,074 | 7/1986 | Pate et al. .................. 428/172 |
| 4,608,404 | 8/1986 | Gardner et al. .................. 523/400 |
| 4,659,532 | 4/1987 | Renger .................. 264/518 |
| 4,690,837 | 9/1987 | Doroszkowski et al. .................. 428/273 |
| 4,737,403 | 4/1988 | Simpson et al. .................. 428/273 |
| 4,861,832 | 8/1989 | Walsh .................. 525/113 |
| 4,999,221 | 3/1991 | Eigenbrod et al. .................. 427/195 |
| 5,021,297 | 6/1991 | Rhue et al. .................. 428/430 |
| 5,084,353 | 1/1992 | Cobbledick et al. .................. 428/413 |
| 5,139,821 | 8/1992 | Suzuki .................. 42/195 |
| 5,175,201 | 12/1992 | Forglone et al. .................. 524/257 |
| 5,178,657 | 1/1993 | Giequel .................. 65/3.43 |
| 5,338,578 | 8/1994 | Leach .................. 427/470 |
| 5,344,672 | 9/1994 | Smith .................. 427/195 |

FOREIGN PATENT DOCUMENTS

| | | |
|---|---|---|
| 0 299 420 | 1/1989 | European Pat. Off. . |
| 3916948A1 | 12/1989 | Germany . |
| 63-182078A | 7/1988 | Japan . |
| 2 042 930 | 10/1989 | United Kingdom . |

*Primary Examiner*—Shrive Beck
*Assistant Examiner*—Fred J. Parker
*Attorney, Agent, or Firm*—Reising, Ethington, Barnard & Perry

[57] ABSTRACT

This invention relates to a method of sealing the porous surfaces that can be generated during the manufacturing and processing of molded plastic parts. Liquid thermoset coatings are applied to preheated parts and cured to create a barrier on the surface to gasses generated during heat curing of subsequently applied surface coatings. The liquid coating may be comprised of polyurethane forming components; those components in combination with unsaturated polyester resins; vinyl ester resin compositions; coatings derived from hydroxyl or carboxyl containing oligomers reacted with alkylated urea-formaldehyde, melamine-formaldehyde, and/or benzoquanamine-formaldehyde resins; and oligomers containing carboxyls reacted with triglycidyl isocyanurate.

20 Claims, No Drawings

LIQUID THERMOSET SEALERS AND SEALING PROCESS FOR MOLDED PLASTICS

This application is a file wrapper continuation, of application Ser. No. 08/081,767, filed on Jun. 23, 1993, by C. Kausch et al., for LIQUID THERMOSET SEALERS AND SEALING PROCESS FOR MOLDED PLASTICS, now abandoned.

FIELD OF INVENTION

The present invention relates to a method of reducing surface defects known as paint pop or paint craters by coating a plastic substrate surface, and more particularly, coating a fiber-reinforced thermoset plastic substrate surface with a liquid thermoset coating composition to provide a barrier to gasses emanating from the plastic during the heat curing of subsequently applied coatings.

BACKGROUND

Molded thermoset plastics are finding increased utilization in a variety of areas such as automotive parts, recreational vehicles, etc. Many of these applications are for painted parts requiring smooth surface appearance and these parts often have in-mold coatings to achieve smoothness and to eliminate paint pops and craters. These molded thermosets also use low profile additives to decrease part shrinkage during molding. The low profile additive and molding conditions can create internal porosity that can entrap air, gasses, and volatile compounds. Any abrasion, cutting, or fracture of the molded parts creates disruptions of the in-mold coating as well as the resin rich skin on said molded part, said disruptions leading to enhanced surface porosity. It is known that during heated cure cycles for subsequent finish paints (coatings) on fiber reinforced thermoset parts, blemishes in the top coating, known as paint pops or craters, can develop. It is believed that gasses evolving from internal porosity create these defects as the gasses try to escape from the molded part during the heated cure cycle for the coating.

U.S. Pat. No. 5,021,297 describes heating a molded plastic part (degassing the part) and then applying a thermoset powder coating over the surfaces of the part that will be subsequently coated. To be effective, this barrier needs to be substantial, 1–6 mils thick.

SUMMARY OF THE INVENTION

This invention relates to a method of coating a plastic substrate surface, and more particularly to a method of coating a fiber-reinforced thermoset plastic substrate surface with a liquid thermoset coating composition to provide a barrier to gasses generated from the plastic during the heating of subsequently applied surface coatings. Such gasses which evolve from the plastics during heating cause paint pops or paint craters. The fiber reinforced thermoset plastic substrate may be formed by compression molding of sheet molding compound (SMC). The present coatings are useful for sealing of the surfaces of the plastic substrate which are not covered by coatings (i.e., in-mold coatings) applied during the compression molding process before the part is removed from the mold. The uncoated surfaces may occur at the edges of parts which are not easily covered with an in-mold coating or on any surfaces which are exposed by machining (for example sanding, routing, punching, or drilling). If these uncoated surfaces are left uncovered, outgassing from the part readily leads to paint popping in subsequent paint coatings in the area of the exposed edges.

This invention describes coating materials which have potential to effectively perform as sealers, particularly edge sealers, and prevent the problems resulting from substrate outgassing during subsequent paint processes.

DETAILED DESCRIPTION OF THE INVENTION

Liquid thermoset coatings are described which can be applied to the surfaces of molded plastic parts, preferably to surfaces which have not been covered by in-mold coatings or to surfaces where the in-mold coating or the resin rich surface layer has been disrupted or removed. These coatings will minimize the number and/or severity of surface defects that occur in subsequent surface coatings, e.g., paint, on the part during heated oven curing cycles for subsequently applied coatings. The defects to be minimized are known as paint pops or craters. They are believed to be caused by gasses leaving the porous areas of the molded plastic part and traversing through the coating. The liquid thermoset can provide a barrier to gasses and thereby reduce paint pop or craters.

Fiber reinforced thermoset molded plastic parts are preferred. These are typically from about 10 to about 75 wt. % fibers, and preferably 25–35 wt. % fibers. Glass fibers are preferred. Low profile additives are used in these parts to decrease shrinkage of the part. Low profile additives prevent shrinkage in thermoset parts by a mechanism which leads to microvoids or micropososity within the plastic parts. A resin rich layer typically exists where the part was in contact with the mold surface. This resin rich layer is less porous than the plastic below the surface. The resin rich layer, if not disrupted, can partially block the passage of gasses from the internal porosity. To totally block passage of gasses, coatings such as in-mold coatings must be applied.

Preferred thermoset compositions include unsaturated polyester resins cured through crosslinking with ethylenically unsaturated monomers such as styrene. Other related resins include vinyl ester resins (made by coupling (alkyl) acrylic acid with hisphenol A epoxy resins), epoxy resins, phenolics, and melamine formaldehyde resins. Preferred unsaturated polyester resins are made from diols or alkylene oxides having 2 to 12 carbon atoms and unsaturated dicarboxylic acids or their anhydrides containing from 3 to 12 carbon atoms. Mixtures of unsaturated and saturated dicarboxylic acids and their anhydrides can be used.

Desirably, the thermoset plastic parts are in-mold coated during the molding process. In-mold coating tends to cover and minimize surface defects on the part, and if it is a thermoset composition, it can function like the sealer to prevent gasses from traversing through subsequent surface coatings.

The in-mold coating as well as the resin rich layer of the molded plastic parts can be disrupted by being abraded away, ruptured, or it may be incompletely or inadequately formed. Common causes of discontinuities in the resin rich layer are air entrapment, insufficient dispersion or wetting of fibers or fillers, microcracks from localized failure, and non-compacted resin areas. The discontinuities are called pits, cracks, pores, and crevices. The in-mold coating as well as the resin rich layer can be ruptured during subsequent processing of the part. For example, they can also be disrupted by machining processes to remove flashing, reduce the size or dimensions of the part, or operations to cut out holes or openings in the part. These areas are typically further abraded or sanded to leave a smoother surface for painting. These processes remove the in-mold coating and resin rich layer and open the internal porosity to the surface, enhancing the probability of paint pops or craters in subsequent surface coatings.

The coating compositions are desirably applied to a preheated surface of the part. The coating compositions will be referred to as sealer compositions. The part will be referred to as the substrate. The substrate is desirably heated from about 120° F. (49° C.) to about 400° F. (204° C.), more desirably from about 170° F. (77° C.) or 200° F. (93° C.) to about 350° F. (177° C.) or 200° F. (93° C.) to about 350° F. (177° C.), and preferably from about 250° F. (121° C.) to about 300° F. (149° C.) before applying the sealer. The heating will reduce volatiles or gasses in the part, may enhance wetting or spreading of the sealant on the substrate, and may lower the viscosity of the sealant, allowing it to better penetrate the surface disruptions. Desirably, the coating is cured at least partly immediately after application and fully cured within minutes or hours after being applied. The cure temperature depends on the curing mechanism.

The sealant can be applied with any known method, such as brush, roller, sponge, spatula, coating applicators, and air or airless sprayers. After a uniform layer is applied to the desired surfaces, any excess material may be removed. Preferred methods of removal include wiping with a cloth, sponge, squeegee or equivalent. Thus the sealer coating may be made or reduced to 5 mils thick or less, preferably from about 0.5 to about 3 mils thick, and most preferably not more than 1 mil thick.

If the molded part does not have an in-mold coating, it may be desirable to apply the sealer to all or most of the surfaces, especially those that will be subsequently painted. On in-mold coated parts, it is desirable to apply the sealant to edges where in-mold coating was not applied or was removed by some type of machining (for example, sanding, routing, punching out or drilling). The machining processes disrupt the resin rich layer exposing the more porous internal plastic to the surface. It is also desirable to extend the application of sealer compositions several millimeters past the surface disruptions in that areas near disrupted resin rich layers have an increased tendency to have paint pops or craters.

One or more coatings of traditional paints and coating materials may be applied over the sealer compositions. One or more of these are desirably baked subsequent to application at temperatures from about 120° F. (49° C.) to about 400° F. (204° C.), and more desirably from about 170° F. (77° C.) or 200° F. (93° C.) to about 350° F. (177° C.). These subsequently applied coatings will have fewer and less severe paint pops or craters due to the application of the thermoset sealer compositions.

These sealer compositions differ from traditional in-mold coatings in that they are applied primarily to surfaces not previously covered by in-mold coatings and surfaces created subsequent to molding by machining processes. In-mold coatings are only applied to surfaces that are accessible to the coating within the mold. These sealer compositions seal and fill roughened surfaces which cannot be coated within the mold. The in-mold coatings are cured within a confined space under pressure. The sealer compositions are cured with one surface being the substrate and the other surface being the atmosphere.

The sealer compositions can be comprised of the components of in-mold coating compositions such as described in U.S. Pat. No. 4,081,578, which is hereby incorporated by reference. The viscosity and cure time would desirably be adjusted to facilitate application and curing of the composition outside of the mold. Other U.S. Patents which further expand the possible components are U.S. Pat. Nos. 4,331,735, 4,374,238; 4,414,173; and 4,508,785, which are hereby incorporated by reference.

Desirable sealer compositions include reactants which form polyurethane compositions. These are comprised of the reaction products of polyisocyanate compounds with polyols and other species such as polyamines, polycarboxylic acids, and poly mercaptans. The polyisocyanates compositions can be moisture cured, crosslinked with species reactive with the isocyanates having functionality greater than 2, trimerized, or by combinations of the above. The isocyanates can be blocked isocyanates with blocking agents such as oximes, caprolactam, phenols, or benzotriazole. These blocked isocyanates can be unblocked by raising the initial reaction temperature. The polyurethane compositions may contain other species reactive through other mechanisms such as unsaturated polyesters or vinyl esters which are crosslinked by copolymerization with ethylenically unsaturated monomers.

The isocyanates include compounds of the formula R—(NCO)$_n$, where n is from 1 to 4, and preferably is from 2 to 3, where R can be an aromatic group, a lower alkyl substituted aromatic, an aliphatic or cycloaliphatic having 1 to 14 carbon atoms, or combinations of one or more aromatic and one or more aliphatic moieties combined having up to 16 carbon atoms. Specific examples include diphenylmethane-p,p'-diisocyanate or oligomers thereof, 2,4, and 2,6-tolylene diisocyanate, isophorone diisocyanate, and hexamethylene diisocyanate.

The polyols may be poly(alkylene oxides) where the alkylene group has 1 to 5 carbon atoms; saturated polyesters from dicarboxylic acids or their anhydrides having 4–12 carbon atoms and the above alkylene oxide monomers; polyesters from ring opening polymerizations of cyclic esters having 3 to 6 carbon atoms, such as polycaprolactone; and hydroxyl terminated polymers from dienes having 4 to 6 carbon atoms or copolymers of said dienes with styrene or acrylonitrile or other vinyl monomers. They desirably have molecular weights from 200 to 5000.

The polyols can be low molecular weight chain extenders having 2 to 20 carbon atoms such as ethylene glycol, propylene glycol, 1,4 butanediol, 1,4-bis(2-hydroxyethoxy) benzene.

One can use polyamines such as aliphatic diamines or triamines having from 1 to 20 carbon atoms, aromatic diamines or triamines having from 6 to 20 carbon atoms, or amines containing aliphatic substituted aromatic groups or made from aromatic substituted aliphatic groups, each having from 7 to 20 carbon atoms.

Poly(alkylene oxides) which are terminated with amine groups can also be used. Examples of such amine terminated polyols are the Jeffamine™ (Texaco) and Polamines (Air Products). Desirably, their molecular weights can be from about 200 to 5000.

Higher functionality polyols can be used to crosslink the composition to provide a thermoset composition with good high temperature strength. These polyols usually have molecular weights from about 100–8,000 and have three or more hydroxyl groups per molecule. Examples include trimethylol propane and pentaerythritol. A preferred crosslinker polyol is a propylene oxide or ethylene oxide chain extended pentaerythritol having a molecular weight of from about 400 to about 650.

Crosslinking polyamines can also be used to crosslink a polyurethane composition. Functionality of three or more is desirable for crosslinking, a polyamine having three or more primary amines or secondary amine groups is desirable. The polyamines for crosslinking desirably have molecular weights from about 60 to about 500. Amine terminated poly(alkylene oxides) (Jeffamines) of functionality greater than two can also be utilized for crosslinking. Their molecular weights are desirably 200–5000.

The polyurethanes can be reacted in a variety of sequences that have some effects on the molecular structure. More common examples are prereacting some or all of the polyisocyanates with some or all of the one or more polyols to create isocyanate terminated polyols. The isocyanate terminated polyols are then reacted with the other components and cured. Or as previously recited at some stage in production, any excess unreacted isocyanate groups may be blocked with a blocking agent. Then that compound can be combined with molecules reactive with unblocked isocyanate groups. Sometime subsequent to mixing, the isocyanates can be unblocked and the composition will proceed to cure. The polyurethane compositions can be one part or any number of parts in excess of one.

Suitable unsaturated polyester resins that can be reacted in combination with polyurethanes include the condensation products of low molecular weight diols (diols containing 2–12 carbon atoms) with dicarboxylic acids or their anhydrides (anhydrides and dicarboxylic acids having from 3 to 12 carbon atoms). Preferably at least 50 mole % of the dicarboxylic acids and anhydrides contain unsaturation. Mixtures of more than one dicarboxylic acid and/or more than one diol can be used. Maleic anhydride or its dicarboxylic acid can be isomerized to fumarate units after incorporation in the polyester. Desirably, these polyesters have a molecular weight from about 500 to 5,000.

In lieu of a portion or all of the unsaturated polyesters, one can use vinyl ester resins in combination with polyurethane compositions. Vinyl ester resins can include free radically polymerizable epoxy-based oligomers having at least two acrylate (or methacrylate or ethacrylate) groups prepared by reacting the corresponding acids (such as acrylic acid) with epoxy groups on the epoxy-based oligomer or resin. Other epoxy resins include polyglycidyl ethers of polyphenols such as those made from alkyl or halogen substituted bisphenol A, epoxies from bisphenol F, phenol formaldehyde resins reacted with epichlorohydrin (novolak epoxies), tetraphenylolethane epoxy; dicycloaliphatic epoxy resins made by the epoxidation of cycloolefins with peracids; aromatic glycidyl amine resins; polyglycidyl esters formed from aliphatic, cycloaliphatic, or aromatic polycarboxylic acids which are reacted with epichlorohydrin and then dehydrohalogenated; polyglycidyl ethers of polyhydric polyols; and cycloaliphatic epoxy resins. These desirably have 2 or more reactive 1,2-epoxy groups per molecule or oligomer. Examples of epoxy-based oligomers or resins include bisphenol A epoxy, tetrabromo bisphenol A epoxy, phenolic novolak epoxy, tetraphenylolethane epoxy, dicycloaliphatic epoxy, and so forth. Mixtures of the above epoxy resins can be used. Of these materials it is preferred to use diacrylate terminated bisphenol A epoxy oligomers having average molecular weights of from about 500 to about 1500. The general structure of a typical vinyl ester resin, whose size can vary depending on the number of monomer units, is given by the formula below, wherein n is desirably 1, 2, or 3 and is preferably 1.

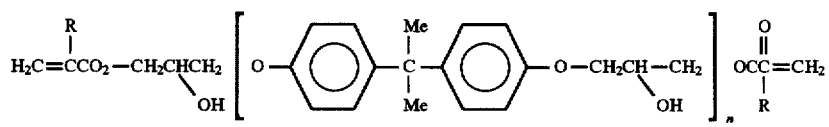

Ethylenically unsaturated monomers include styrene and lower alkyl substituted styrenes, esters of acrylic and methacrylic acid having 1 to 10 carbon atoms in their ester portion and vinyl acetates. The composition may also include polyfunctional ethylenically unsaturated monomers in free radical polymerizations that serve as crosslinking agents such as divinylbenzene.

Typical free radical initiators may be used for curing unsaturated polyesters or vinyl esters by copolymerizing the unsaturation in the polymers with the ethylenically unsaturated monomers. These may be traditional peroxides and hydroperoxides such as benzoyl peroxide, dicumyl peroxide, cumene hydroperoxide, tert-butyl perbenzoate, and the like. These molecules have a peroxide linkage between one or more organo groups. The organo groups may be various alkyl, aromatic or alkyl-substituted aromatic groups having 3 to 20 carbon atoms. The organo groups may have a carbonyl group.

Accelerators for the free radical initiator can be used. Examples of such materials are cobalt octoate, zinc naphthenate, lead naphthenate, cobalt naphthenate, and magnesium naphthenate. Soluble Co, Mn, and Pb salts of linoleic acid can be used. Mixtures of accelerators can be used. They can be used in amounts from 0.01 part to about 1 part by weight per 100 parts by weight of the (alkyl) acrylate terminated epoxy oligomers and/or the unsaturated polyesters.

and wherein R is a hydrogen atom or an alkyl group. Vinyl ester resins are prepared by reacting epoxy resins such as the addition products of 1-chloro-2,3-epoxypropane with 2,2'-bis(4-hydroxyphenyl)propane with either methacrylic or acrylic acid. The terminal unsaturation can be crosslinked with ethylenically unsaturated monomers such as styrene in the same fashion as an unsaturated polyester.

In addition to being utilized in combination with polyurethane compositions, the vinyl ester resins crosslinked with ethylenically unsaturated monomers such as styrene may be utilized alone as effective sealers. Such compositions are previously described in the U.S. patents incorporated by reference.

Other thermoset resin compositions which may provide desirable sealer coatings are compositions containing saturated polyesters, polyethers or acrylic resins which contain two or more hydroxyl and/or carboxyl groups per molecule which are reactive with alkylated urea-formaldehyde resins, melamine-formaldehyde resins or benzoquanamine-formaldehyde resins. The saturated polyesters may be prepared by reaction of low molecular weight diols (2–12 carbon atoms) with saturated dicarboxylic acids or their anhydrides (3–12 carbon atoms). Suitable polyethers are poly(alkylene oxides) where the alkylene group has from 1–5 carbon atoms. Suitable acrylic resins may be made by the free radical copolymerization of the various acrylate or methacrylate monomers (3–12 carbon atoms) or combinations thereof with hydroxy or carboxy functional monomers like hydroxyethyl acrylate or methacrylate, hydroxypropyl acrylate or methacrylate, acrylic acid or methacrylic acid. This type of coating is further described in U.S. Pat. No. 4,603,074, which is hereby incorporated by reference.

Still other thermoset compositions which may provide desirable edge sealers include carboxyl functional oligomers or polymers which are crosslinked with triglycidyl isocyanurate (TGIC). Suitable oligomers or polymers are saturated polyesters, polyethers or acrylic resins containing two or more carboxylic acid functional groups per molecule. These oligomers or polymers are the same as those described earlier which are crosslinkable with the alkylated urea, melamine or benzoquanamine-formaldehyde resins except that they contain predominantly carboxyl functionality and not appreciable amounts of hydroxyl functionality.

The polyester and polyether resins described in the above paragraphs desirably have molecular weights from about 200 to 8000. The acrylic resins desirably have molecular weights from about 200 to 8,000 or 10,000. Optionally, the acrylic resins may contain up to 20 wt. % acrylic polymers of greater than 10,000 molecular weight and desirably only up to 10 wt. % acrylic polymers above 10,000 molecular weight.

As previously described in the U.S. patents incorporated by reference, the unsaturated polyester resins can include urethane polymers with or without unsaturation reactive with the ethylenically unsaturated monomers.

The liquid sealer composition may contain a variety of additives to enhance certain aspects of its performance. Fillers such as talc, mica and silicas can be effectively used to improve adhesion and control viscosity and flow properties. Conductive pigments such as graphite and carbon black can be added to make the coating conductive. Desirably, these two pigments are used in combination. The graphite can desirably be present up to about 150, more desirably from about 5 to about 120, and preferably from about 20 to about 75 parts per 100 parts of said composition. The carbon black is desirably present up to about 25, more desirably from 0.5 to about 15, and preferably from about 1 to about 10 parts by weight per 100 parts of said composition.

The liquid sealer composition may include antioxidants to protect the polymers from oxidation and ozone, pigments, moisture scavengers to block undesirable reactions with water, low profile additives to minimize shrinkage, nonreactive and reactive diluents to control the viscosity, and adhesion promoters.

The sealer composition has utility to seal the disrupted surfaces of molded plastic parts to minimize the formation of paint pops or craters during oven baking of subsequently applied coatings. The composition also fills and levels the surface of molded plastic parts. These effects minimize the need to inspect, reject and rework molded plastic parts which are painted and oven baked. The parts have utility as automotive body panels, parts on recreational sport vehicles, housings for electronics, and structural or housing elements for consumer or industrial products.

The invention may be better understood by the following examples.

EXAMPLES

Example 1

Component A

1. PPG 425, Polypropylene ether diol, 400 MW available from ARCO.
2. PPG 1025, Polypropylene ether diol, 1000 MW available from ARCO.
3. Lubranate™ M—Diphenylmethane diisocyanate from BASF.
4. Talc—4416 from Whittaker, Clark & Daniels (W.C.D.).

A mixture of PPG 425 (18.1 gms, 84.9 meq), PPG 1025 (16.9 gms, 33.5 meq) and talc (20 gms) is prepared in a 500 ml round bottom flask. The mixture is heated to 110° C. with stirring under vacuum. After two hours, the mixture is cooled to 80° C. and Lubranate™ M (45.0 gms, 358.6 meq) is added. The final mixture is heated at 80° C. for two hours before cooling to room temperature. The mixture is stored in an air tight container under nitrogen.

Component B 1. 1000 MW polypropylene fumarate diol prepared using complex cyanide catalysis (U.S. Pat. No. 3,538,043), 70% in styrene.
2. PEP 550 polypropylene ether tetrol from BASF.
3. Tertiary butyl peroxybenzoate (TBPB).
4. Dabco™ T-5 (Dibutyltin disulfide, from Air Products).
5. Talc 4416 from W.C.D.
6. Benzoquinone (2% in styrene) BQ.

A mixture of polypropylene fumarate diol in 30% styrene (90 gms, 126 meq), PEP 550 (15 gms, 119 meq), TBPB (2.0 gms), Dabco™ T-5 (0.1 gms), BQ in styrene (2.0 gms) and dry talc (10 gms) is prepared. This mixture is stirred in a 500 ml round bottom flask at 30° C. under vacuum for 2 hours.

Component A (10 grams), is mixed with Component B (11.9 grams) and immediately applied to the uncoated edge of a molded SMC panel which is preheated at 150° C. After application, the FRP panel is heated at 150° C. for 5 minutes. The resultant panel is painted with an automotive paint primer.

Example 2

1. 1000 MW polypropylene fumarate diol, 70% in styrene. (76.5 gms, 107 meq).
2. Phenyl isocyanate (Aldrich Chemical Company, 12.8 gms, 107.5 meq).
3. 2% BQ in styrene, 2.5 gms.
4. Dabco™ T-5, 0.1 gms.
5. LP-90 (polyvinylacetate, 40% in styrene, Union Carbide). 57.5 gms.
6. Talc 4416. 57.5 gms.
7. TBPB. 1.25 gms.
8. Isonate™ 143L (Dow Chemical Modified diphenylmethane-diisocyanate). (70 gms, 486.5 meq).
9. Hydroxypropyl methacrylate. (26.6 gms, 184 meq).

A mixture of the polypropylene fumarate diol, phenyl isocyanate, BQ in styrene, and Dabco™ T-5 is prepared in a round bottom flask. This mixture is allowed to stir 18 hours at room temperature. Then, the LP-90, talc 4416, and isonate 143L is added and allowed to react at room temperature for 5 hours. Finally, the TBPB and hydroxypropyl methacrylate is added and the resultant blend is thoroughly mixed. This mixture is applied to the uncoated edges of a molded SMC panel which is preheated to 150° C. After application, the FRP panel is heated at 150° C. for 5 minutes. The coated panel is stored under ambient conditions for at least 24 hours before painting with an automotive paint primer.

Example 3

1. LP-90 (40% polyvinyl acetate in styrene), 25 gms.
2. Hydroxypropylmethacrylate. 30 gms.

3. Styrene. 45 gms.

4. 2% BQ in styrene. 7 gms.

5. Cobalt Octoate. 0.15 gms.

6. Vinyl ester resin, 85% in styrene, (acrylic acid terminated bisphenol A based epoxy resin). 115 gms.

7. Conductive carbon black. 8.5 gms.

8. Talc 4416. 90 gms.

The ingredients listed above are added to a round bottom flask and thoroughly mixed at 40° C. under vacuum. To this mixture is added tertiary butyl peroxybenzoate (4.5 gms). After mixing thoroughly, the composition is applied to the uncoated edges of a molded SMC panel which is preheated to 150° C. After application, the FRP panel is heated at 150° C. for 5 minutes. The resultant panel is painted with an automotive paint primer.

Example 4

1. Polybutylene oxide (2000 MW, Dow Chemical).

2. Lubranate™ M (Diphenylmethane diisocyanate BASF).

3. 2-butanone oxime.

4. Dabco™ T-12 (dibutyltin dilaurate, Air Products).

5. Talc 4416.

Lubranate™ M (18.8 gms, 150 meq) is added to a round bottom flask under a nitrogen blanket. The flask and contents are heated to 80° C. and stirred under $N_2$ Polybutylene oxide (50 grams, 50 meq) is added dropwise over a period of two hours. After addition, the 2-butanone oxime (90 gms, 104 meq) is added in one portion. The resultant mixture is reacted for an additional one hours. A sample (1 ml) is withdrawn and an infrared spectrum is obtained. If the NCO absorbance at 2270 $cm^{-1}$ is absent, the reaction is completed. If incomplete, an additional 1.0 gm of 2-butanone oxime is added and the mixture again heated for one hour. Upon completion, the reaction product is mixed with 15 grams talc and 0.1 gram Dabco™ T-12.

The composition is applied to the uncoated edges of a molded SMC panel which is preheated to 150° C. After application of the coating, the SMC panel is heated for 5 minutes at 150° C. The coated panel is stored under ambient conditions for at least 24 hours before being painted with an automotive paint primer.

Example 5

Component A

1. PPG 3025, polypropylene ether diol, 3000 MW ARCO. (41.4 gms, 27.5 meq).

2. Isonate 2191, Modified diphenylmethane diisocyanate, Dow Chemical (30.0 gms, 214 meq).

3. Talc 4416 (28 gms).

Component B

1. PEP 550—Polypropylene ether tetrol, BASF.

2. Talc 4416 (31.20 gms).

3. Ethylene diamine (1.0 gms).

4. Dabco T-5 (Dibutyltin disulfide, Air Products). (0.2 gms).

To prepare Component A, the PPG 3025 and talc 4416 is added to a round bottom flask. The mixture is stirred under vacuum at 110° C. for two hours. The mixture is cooled to 80° C. and the isonate 2191 is added. The mixture is stirred at 80° C. for two hours under vacuum and then cooled to room temperature. The resultant product is stored in an air tight container under nitrogen.

To prepare Component B, the PEP 550, and talc are heated under vacuum at 110° C. for two hours. The mixture is cooled to room temperature and the ethylene diamine and Dabco T-5 is mixed in thoroughly. The resultant mixture is stored under $N_2$ in an air tight container.

Component A (4.0 parts) is mixed thoroughly with Component B (1.0 parts) using two component meter-mixing equipment. The resultant mixture is immediately applied to the uncoated edges of a molded SMC panel which is preheated to 150° C. After application, the FRP panel is heated at 150° C. for at least one minute. The coated panel is painted with an automotive paint primer.

Example 6

1. Saturated Polyester Resin (42 grams), hydroxyl terminated made from trimethyolpropane, 2,2-dimethyl-1,3-propanediol, 1,4-cyclohexanedimethanol, phthalic anhydride and adipic acid.

2. Liquid hexamethoxymethyl melamine resin. (14 gms).

3. p-toluene sulfonic acid. (6.5 grams).

4. Talc 4416. (5 grams).

The polyester resin, melamine resin, and Talc 4416 are mixed at 50° C. under vacuum. When completely mixed, the p-toluene sulfonic acid is added and the resultant blend is thoroughly mixed and immediately applied to the uncoated edges of a molded SMC panel which was preheated to 150° C. The coated panel is heated at 150° C. for at least 5 minutes. The coated panel is painted with an automotive paint primer.

Example 7

A carboxyl terminated saturated polyester (polypropylene adipate, 1000 MW, 100 grams, 200 meq), is mixed in a round bottom flask under vacuum at 50° C. with triglycidyl isocyanurate (20 grams, 202 meq) and Talc 4416 (10 grams). After mixing under vacuum for 1 hour, the resultant mixture is applied to the uncoated edges of a molded SMC panel which is preheated to 150° C. After application, the coated panel is heated at 150° C. for at least 10 minutes. The resultant panel is painted with an automotive paint primer.

While in accordance with the Patent Statutes, a preferred embodiment and best mode has been presented, the scope of the invention is not limited thereto, but rather is measured by the scope of the attached claims.

What is claimed is:

1. A process for decreasing defects, caused by emanating subsurface gasses, in a subsequent coating applied over a machined surface of a molded thermoset fiber reinforced plastic part, said process comprising:

heating said molded thermoset fiber reinforced plastic part to a temperature of from about 49° C. to 204° C.;

applying a coating of a liquid thermosettable composition to the machined surface of said part while said part is at a temperature from about 49° C. to 204° C.; and curing said liquid thermosettable composition to form a thermoset barrier for said gasses, wherein said liquid thermosettable composition consists essentially of a) an unsaturated polyester resin and/or a vinyl ester resin; at least one crosslinking ethylenically unsaturated monomer; and an initiator, optionally with an accelerator or mixture of accelerators; or b) a reaction product of at least one polyisocyanate with at least one member selected from the group consisting of polyols, polyamines, polymercaptans, and polycarboxylic acids; or c) the reaction product of b) and a crosslinker having functionality greater than 2 selected from species reactive with isocyanate; or d) combinations of a) and b); or e) a saturated polyester, polyether, or acrylic resin containing two or more hydroxyl and/or carboxyl groups per molecule along with an alkylated urea-formaldehyde resin, melamine-formaldehyde resin, or benzoguanamine-formaldehyde resin, and optional components selected from the group consisting of fillers, conductive pigments, antioxidants, pigments, moisture scavengers, low profile additives, and diluents.

2. A process according to claim 1, wherein said heating is to a temperature of from about 77° C. to about 177° C.

3. A process according to claim 2, wherein said liquid thermosettable composition includes sufficient conductive pigments such that the cured composition is electrically conductive.

4. A process according to claim 2, wherein said heating is to from about 93° C. to about 177° C.

5. A process according to claim 2, wherein said heating is to a temperature of from about 121° C. to about 149° C.

6. A process according to claim 4, wherein said liquid thermoset composition comprises a polyisocyanate and a polyol.

7. A process according to claim 6, said liquid thermosettable composition further including unsaturated polyester resins and ethylenically unsaturated monomers.

8. A process according to claim 4, wherein said liquid thermosettable composition comprises vinyl ester resins and ethylenically unsaturated monomers.

9. A process according to claim 4, wherein said liquid thermosettable composition comprises (a) oligomers having two or more hydroxyl and/or carboxyl groups per molecule and (b) alkylated urea-formaldehyde, melamine formaldehyde, or benzoquanamine-formaldehyde resins wherein said oligomers comprise polyesters and/or polyethers of molecular weights from about 200 to about 8,000, or acrylic resins of which 80 wt. % have molecular weights from about 200 to 10,000 or combinations thereof.

10. A process according to claim 4, wherein said liquid thermosettable composition comprises (a) oligomers having two or more carboxyl groups per molecule, said oligomers comprising polyesters and/or polyethers of molecular weights from about 200 to 8,000, or acrylic resins of which 80 wt. % or more have molecular weights from about 200 to 10,000, or combinations thereof; and (b) triglycidyl isocyanurate.

11. A process for decreasing pops and/or craters in a paint applied over a molded fiber reinforced thermoset plastic part having at least one machined surface, said process comprising:

preheating said machined surface of said molded thermoset part to a temperature from about 49° C. to 204° C.;

applying in an environment other than a closed mold a sealer coating of a liquid thermosettable composition to said machined surface while said surface is at a temperature from about 49° C. to 204° C.;

curing said sealer coating; and applying at least one further coat of material and curing said further coat of material by application of heat, wherein said liquid thermosettable composition consists essentially of a) an unsaturated polyester resin and/or a vinyl ester resin along with at least one crosslinking ethylenically unsaturated monomer and an initiator, optionally with an accelerator or mixture of accelerators; or b) a reaction product of at least one polyisocyanate with at least one member selected from the group consisting of polyols, polyamines, polymercaptans, and polycarboxylic acids; or c) the reaction product of b) and a crosslinker having functionality greater than 2 selected from species reactive with isocyanate; or d) combinations of a) and b); or e) a saturated polyester, polyether, or acrylic resin containing two or more hydroxyl and/or carboxyl groups per molecule along with an alkylated urea-formaldehyde resin, melamine-formaldehyde resin, or benzoguanamine-formaldehyde resin, and optional components selected from the group consisting of fillers, conductive pigments, antioxidants, pigments, moisture scavengers, low profile additives, and diluents.

12. A process according to claim 11, wherein said preheating is to a temperature of from about 77° C. to about 177° C.

13. A process according to claim 12, wherein said liquid thermosettable composition includes sufficient conductive pigments such that the cured composition is electrically conductive.

14. A process according to claim 12, wherein said preheating is from about 93° C. to about 177° C.

15. A process according to claim 12, wherein said preheating is to a temperature of from about 121° C. to about 149° C.

16. A process according to claim 14, wherein said liquid thermosettable composition comprises a polyisocyanate and a polyol.

17. A process according to claim 16, wherein said liquid thermosettable composition further comprises an unsaturated polyester resin and an ethylenically unsaturated monomer.

18. A process according to claim 14, wherein said liquid thermosettable composition comprises a vinyl ester resin and an ethylenically unsaturated monomer.

19. A process according to claim 14, wherein said liquid thermosettable composition comprises (a) oligomers having two or more hydroxyl and/or carboxyl groups per molecule and (b) alkylated urea-formaldehyde, melamine formaldehyde, or benzoquanamine-formaldehyde resins wherein said oligomers comprise polyesters and/or polyethers of molecular weights from about 200 to about 8,000, or acrylic resins of which 80 weight percent have molecular weights from about 200 to 10,000 or combinations thereof.

20. A process according to claim 14, wherein said liquid thermosettable composition comprises (a) an oligomer having two or more carboxyl groups per molecule, said oligomer comprising polyester and/or polyether of molecular weight from about 200 to 8,000, or acrylic resin of which 80 weight percent or more has a molecular weight from about 200 to 10,000, or combinations thereof; and (b) triglycidyl isocyanurate.

* * * * *